(12) United States Patent
Guo et al.

(10) Patent No.: US 10,040,898 B2
(45) Date of Patent: Aug. 7, 2018

(54) METHOD FOR ONE-STEP SYNTHESIS OF FUNCTIONAL POLYESTERS BY ORGANIC CATALYSIS

(71) Applicant: NANJING TECH UNIVERSITY, Nanjing (CN)

(72) Inventors: Kai Guo, Nanjing (CN); Yihuan Liu, Nanjing (CN); Ning Zhu, Nanjing (CN); Xin Hu, Nanjing (CN); Zheng Fang, Nanjing (CN); Weiyang Feng, Nanjing (CN); Weijun Huang, Nanjing (CN)

(73) Assignee: NANJING TECH UNIVERSITY, Nanjing (CN)

( * ) Notice: Subject to any disclaimer, the term of this patent is extended or adjusted under 35 U.S.C. 154(b) by 0 days.

(21) Appl. No.: 15/365,351

(22) Filed: Nov. 30, 2016

(65) Prior Publication Data

US 2017/0081468 A1    Mar. 23, 2017

(30) Foreign Application Priority Data

Aug. 31, 2016  (CN) .......................... 2016 1 0795177

(51) Int. Cl.
| | | |
|---|---|---|
| *C08G 63/08* | (2006.01) | |
| *C08G 63/82* | (2006.01) | |
| *C08G 63/90* | (2006.01) | |
| *C08G 63/688* | (2006.01) | |

(52) U.S. Cl.
CPC .......... *C08G 63/823* (2013.01); *C08G 63/08* (2013.01); *C08G 63/688* (2013.01); *C08G 63/90* (2013.01)

(58) Field of Classification Search
CPC ..... C08G 63/08; C08G 63/688; C08G 63/823
See application file for complete search history.

(56) References Cited

PUBLICATIONS

Zhu et al (Highly chemoselective lipase from *Candida* sp. 99-125 catalyzed ring-opening polymerization for direct synthesis of thiol-terminated poly(ε-caprolactone, Chinese Chemical Letters 26 (2015) 361-364, Available online Nov. 13, 2014).*

Makiguchi et al (Diphenyl Phosphate as an Efficient Cationic Organocatalyst for Controlled/Living Ring-Opening Polymerization of δ-Valerolactone and ε-Caprolactone, Macromolecules 2011, 44, 1999-2005)., Oct. 2011.*

Ning Zhu, et al. "Organocatalyzed chemoselective ring-opening polymerizations", Scientific Reports (2018) ) 8:3734 (DOI:10.1038/s41598-018-22171-6).

Pratt et "Exploration, Optimization, and Application of Supramolecular Thiourea-Amine Catalysts for the Synthesis of Lactide (Co)polymers", Macromolecules, 2006, 39, 7863-7871.

* cited by examiner

*Primary Examiner* — Gregory Listvoyb
(74) *Attorney, Agent, or Firm* — CBM Patent Consulting, LLC

(57) ABSTRACT

It relates to the field of synthetic macromolecular chemistry, and discloses a method for one-step synthesis of thiol-functionalized polyester polyols by organic catalysis. This method uses lactone monomer as reaction raw material, thiol-alcohol as initiator, and diphenyl phosphate as organic catalyst to catalyze and synthesize the thiol-functionalized polyester polyols. The present invention provides a method which is simple, inexpensive, easily controllable and environmentally friendly to prepare thiol-functionalized polyester polyols with the easily available and controllable catalyst. The method can selectively catalyze the ring opening polymerization of lactone to prepare thiol-functionalized polyester polyols using the organic catalyst.

8 Claims, 2 Drawing Sheets

METHOD FOR ONE-STEP SYNTHESIS OF FUNCTIONAL POLYESTERS BY ORGANIC CATALYSIS

This application claims priority to Chinese Patent Application Ser. No. CN201610795177.4 filed on 31 Aug. 2016.

TECHNICAL FIELD

The invention belongs to the technical field of macromolecular synthesis, and relates to an preparation method of thiol-terminated polyester polyols by organocatalysis.

BACKGROUND

Mercapto group has special physical and chemical properties, such as bonding with the metal surface, reversible formatting disulfide bond, etc. Thiol-functionalized polyesters play an important role in the field of chemistry and biology, mainly in three aspects: 1) modification of noble metal nanoparticles, 2) click chemical reaction with double bond, triple bond or isocyanate group to construct new structure macromolecules, 3) preparing the biomimetic surface. Thiol-terminated polyester polyols have attracted much interest in the fields of biomedicine and nanoscience. Therefore, it is of great theoretical and practical value to study the synthesis method of new thiol-functionalized polymers. In recent decades, a variety of synthetic methods have been established. It can be divided into multi-step and one-step method depending on the synthesis process. And it can be divide into free radical polymerization, anionic polymerization, ring-opening polymerization, ring-opening metathesis polymerization and condensation polymerization from the point of view of polymerization mechanism. However, these methods still have some defects, including the use of the catalyst is difficult to control, and the experimental steps are cumbersome, as well as the experimental conditions are demanding.

Currently, catalysts used for the synthesis of thiol-terminated polyester polyols include organic catalysts, metal catalysts, and enzyme catalysts. Enzyme catalysts are critical to the reaction conditions and difficult to control. And metal catalysts will lead to metal residues, which influences the direct application to biomedical materials and nanomaterials. In recent decades, green chemistry has become the focus of research. Synthesis of polymer materials under non-toxic, pollution-free and mild reaction conditions has become the direction which academic and industry researchers strive to achieve together.

SUMMARY

A technical problem to be solved by the present invention is to provide a simple, inexpensive, easily controllable and environmentally friendly process to prepare thiol-terminated polyester.

In order to solve the above technical problems, the technical solution adopted by the invention is as follows:

A method for the one-step synthesis of thiol-functionalized polyester polyols by organocatalysis, characterized in that, lactone monomer as reaction raw material, thiol-alcohol as initiator, and diphenyl phosphate as organic catalyst to prepare thiol-functionalized polyester polyols by catalytic reaction.

Wherein the thiol-functionalized polyester polyols have the following structure:

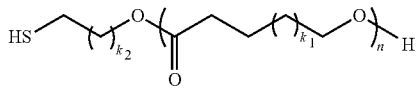

Wherein:
$k_1 = 1, 2$;
$k_2 = 1, 2, 3, 5, 7, 8$;
$n = 10$~$200$.

Wherein the lactone monomers are δ-valerolactone and/or ε-caprolactone. The lactone monomer has the general formula:

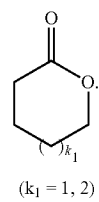

$(k_1 = 1, 2)$

Wherein the structural formula of thiol-alcohol is as follows:

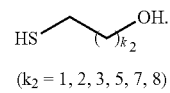

$(k_2 = 1, 2, 3, 5, 7, 8)$

Wherein the reaction molar ratio of the lactone monomer, the thiol-alcohol and the diphenyl phosphate is $(10$~$100):1:(0.1$~$0.5)$, preferably $50:1:0.5$.

Wherein the catalytic reaction is carried out in an organic solvent, such as toluene, benzene, chloroform and methylene chloride.

Wherein the concentration of the lactone monomer is $0.5$~$5$ mol/L, preferably 2 mol/L.

Wherein the reaction temperature is $0$~$100°$ C., preferably $50°$ C.

Wherein the reaction time is $10$~$600$ min, preferably 120 min.

The reaction solution is quenched by adding triethylamine after the reaction process, and the reaction solution is added to methanol at $-30$~$0°$ C. to precipitate into polymer separation, and then the polymer is separated by filtration to white solid and desiccated.

The reaction process of the present invention is as follows:

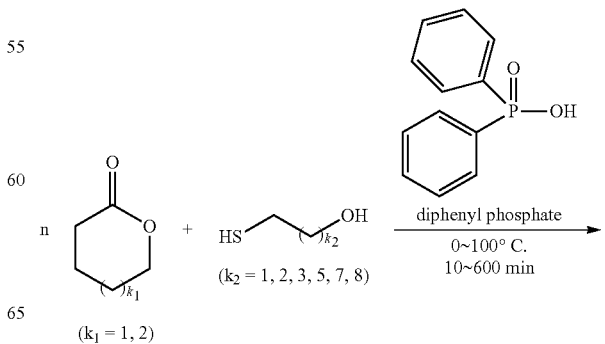

-continued

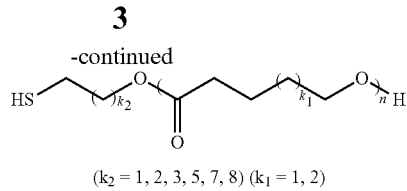

($k_2$ = 1, 2, 3, 5, 7, 8) ($k_1$ = 1, 2)

In the preparation method of thiol-terminated polyester polyols, diphenyl phosphate which is easily available and controllable is used as catalyst.

In the preparation method of thiol-terminated polyester polyols, the structure of the polymer is characterized by $^1$H NMR and $^{13}$C NMR. The molecular weight and the polymer dispersity index are determined by GPC.

Advantageous Effects: The invention has the advantages of simple operation, low cost, with easily available and controllable catalyst and environment friendly. Moreover, the final product yield is high, the selectivity is good, the molecular weight is controllable and the polymer dispersity index is low. The organic catalyst used in the invention has no metal elements and is non-toxic and pollution-free. And it does not need cumbersome catalyst recovery after the reaction, and it does not have to worry about the metal elements remaining in the polymer.

DETAILED DESCRIPTION

The present invention will be better understood according to the following embodiments. However, it will be readily understood by technicians in this field that the description of the embodiments is only for the purpose of illustrating this invention and should not limit the invention as detailed in the Claims.

Figure 1:
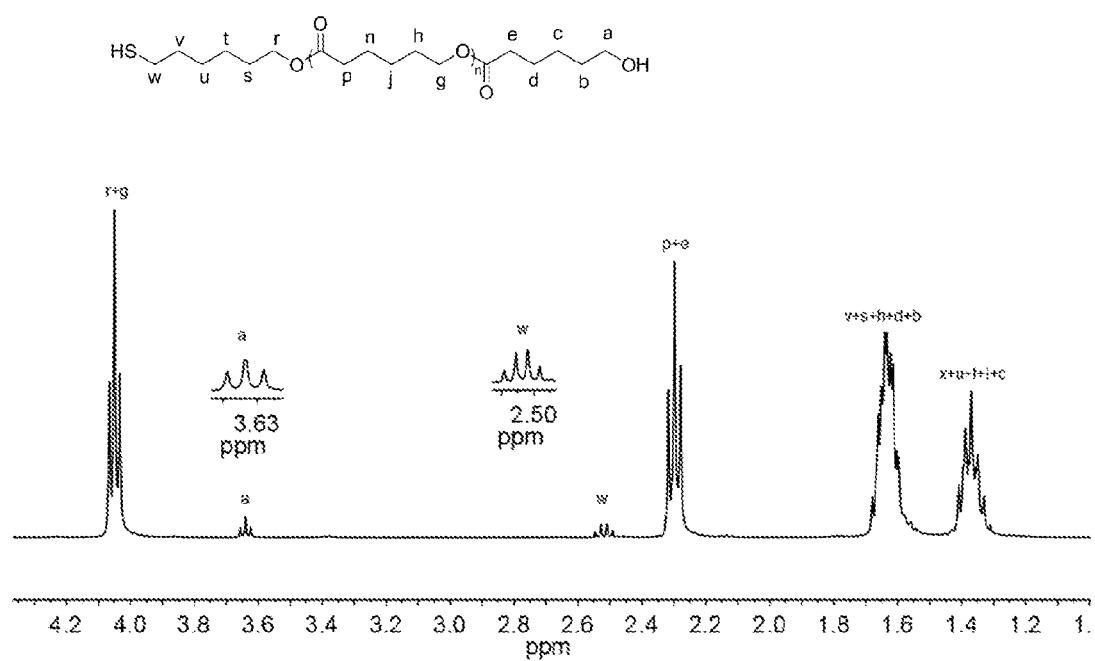
FIG. 1 is the $^1$H NMR chart of the product of Example 1.
Figure 2:
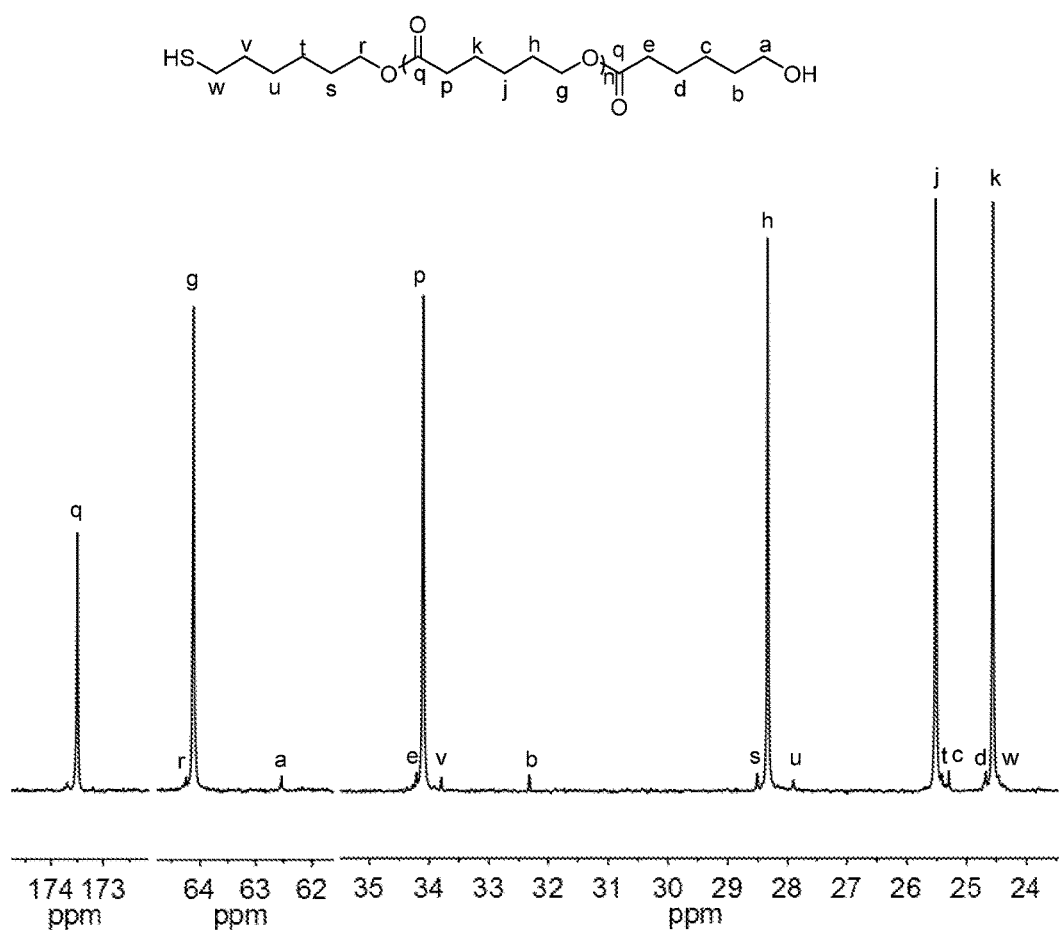
FIG. 2 is the $^{13}$C NMR chart of the product of Example 1.

Embodiment 1

ε-Caprolactone (1.7121 g, 15 mmol), 5.8 ml of toluene, diphenyl phosphate (0.0375 g, 0.15 mmol), 6-mercapto-1-hexanol (0.0403 g, 0.3 mmol) are added into a 20 ml ampoule and mechanically stirred at 50° C. for 2 hours. The reaction is quenched by triethylamine after the reaction. The reaction solution is added to the cold methanol solution until the polymer precipitated. The polymer is isolated by filtration to white solid and transferred to a vacuum oven to desiccation. The polymer is 1.6607 g and the yield of the product is 97%. The structure of the polymer is characterized by $^1$H NMR and $^{13}$C NMR (FIG. 1, 2). The molecular weight and the polymer dispersity index are determined by GPC, and the molecular weight is 5775, as well as the polymer dispersity index is 1.023. NMR verifies that the selectivity reaches 99%.

Embodiment 2

ε-Caprolactone (1.141 g, 10 mmol), 8.8 ml of benzene, diphenyl phosphate (0.1251 g, 0.5 mmol), 6-mercapto-1-hexanol (0.1324 g, 1 mmol) are added into a 20 ml ampoule and mechanically stirred at 0° C. for 2 hours. The reaction is quenched by triethylamine after the reaction. The reaction solution is added to the cold methanol solution until the polymer precipitates. The polymer is isolated by filtration to white solid and transferred to a vacuum oven to desiccation. The polymer is 1.0361 g and the yield of the product is 93%. The structure of the polymer is characterized by $^1$H NMR and $^{13}$C NMR. The molecular weight and polymer dispersity index are determined by GPC, and the molecular weight is 1120, as well as the polymer dispersity index is 1.021. NMR verifies that the selectivity reaches 97%.

Embodiment 3

ε-Caprolactone (1.5018 g, 15 mmol), 3.5 ml of dichloromethane, diphenyl phosphate (0.0075 g, 0.03 mmol), 2-mercapto-1-hexanol (0.0234 g, 0.3 mmol) are added into a 20 ml ampoule and mechanically stirred at 25° C. for 2 hours. The reaction is quenched by triethylamine after the reaction. The reaction solution is added to the cold methanol solution until the polymer precipitated. The polymer is isolated by filtration to white solid and transferred to a vacuum oven to desiccation. The polymer is 1.411 g and the yield of the product is 94%. The structure of the polymer is characterized by $^1$H NMR and $^{13}$C NMR. The molecular weight and polymer dispersity index are determined by GPC, and the molecular weight is 4763, as well as the polymer dispersity index is 1.042. NMR verifies that the selectivity reaches 98%.

Embodiment 4

ε-Caprolactone (2.2828 g, 20 mmol), 2.8 ml of chloroform, diphenyl phosphate (0.0200 g, 0.08 mmol), 3-mercapto-1-hexanol (0.0184 g, 0.2 mmol) are added into a 20 ml ampoule and mechanically stirred at 80° C. for 3 hours. The reaction is quenched by triethylamine after the reaction. The reaction solution is added to the cold methanol solution until the polymer precipitated. The polymer is isolated by filtration to white solid and transferred to a vacuum oven to desiccation. The polymer is 2.100 g and the yield of the product is 92%. The structure of the polymer is characterized by $^1$H NMR and $^{13}$C NMR. The molecular weight and the polymer dispersity index are determined by GPC, and the molecular weight is 10345, as well as the polymer dispersity index is 1.103. NMR verifies that the selectivity reaches 97%.

Embodiment 5

δ-Valerolactone (1.5018 g, 15 mmol), 6.1 ml of toluene, diphenyl phosphate (0.0075 g, 0.03 mmol), 4-mercapto-1-butanol (0.0403 g, 0.3 mmol) are added into a 20 ml ampoule and mechanically stirred at 30° C. for 4 hours. The reaction is quenched by triethylamine after the reaction. The reaction solution is added to the cold methanol solution until the polymer precipitates. The polymer is isolated by filtration to white solid and transferred to a vacuum oven to desiccation. The polymer is 1.4267 g and the yield of the product is 95%. The structure of the polymer is characterized by $^1$H NMR and $^{13}$C NMR. The molecular weight and the polymer dispersity index are determined by GPC, and the molecular weight is 4921, as well as the polymer dispersity index is 1.064. NMR verifies that the selectivity reaches 93%.

Embodiment 6

δ-Valerolactone (1.5018 g, 15 mmol), 1.61 ml of benzenee, diphenyl phosphate (0.0625 g, 0.25 mmol), 8-mercapto-1-octanol (0.0811 g, 0.5 mmol) are added into a 20 ml ampoule and mechanically stirred at 25° C. for 20 minutes. The reaction is quenched by triethylamine after the reaction. The reaction solution is added to the cold methanol solution until the polymer precipitates. The polymer is isolated by filtration to white solid and transferred to a vacuum oven to desiccation. The polymer is 1.3816 g and the yield of the product is 92%. The structure of the polymer is characterized by $^1$H NMR and $^{13}$C NMR. The molecular weight and polymer dispersity index are determined by GPC, and the molecular weight is 5450, as well as the polymer dispersity index is 1.071. NMR verifies that the selectivity reaches 96%.

Embodiment 7

ε-Caprolactone (1.7121 g, 15 mmol), 5.8 ml of chloroform, diphenyl phosphate (0.0225 g, 0.09 mmol), 9-mercapto-1-nonanol (0.0529 g, 0.3 mmol) are added into a 20 ml ampoule and mechanically stirred at 50° C. for 3.5 hours. The reaction is quenched by triethylamine after the reaction. The reaction solution is added to the cold methanol solution until the polymer precipitates. The polymer is isolated by filtration to white solid and transferred to a vacuum oven to desiccation. The polymer is 1.6436 g and the yield of the product is 96%. The structure of the polymer is characterized by $^1$H NMR and $^{13}$C NMR. The molecular weight and the polymer dispersity index are determined by GPC, and the molecular weight is 5755, as well as the polymer dispersity index is 1.042. NMR verifies that the selectivity reaches 98%.

Embodiment 8

ε-Caprolactone (1.7121 g, 15 mmol), 13.3 ml of toluene, diphenyl phosphate (0.0300 g, 0.12 mmol), 6-mercapto-1-hexanol (0.0403 g, 0.3 mmol) are added into a 20 ml ampoule and mechanically stirred at 100° C. for 20 hours. The reaction is quenched by triethylamine after the reaction. The reaction solution is added to the cold methanol solution until the polymer precipitates. The polymer is isolated by filtration to white solid and transferred to a vacuum oven to desiccation. The polymer is 1.6778 g and the yield of the product is 98%. The structure of the polymer is characterized by $^1$H NMR and $^{13}$C NMR. The molecular weight and the polymer dispersity index are determined by GPC, and the molecular weight is 5686, as well as the polymer dispersity index is 1.139. NMR verifies that the selectivity reaches 97%.

Embodiment 9

ε-Caprolactone (1.5018 g, 15 mmol), 1.5 ml of dichloromethane, diphenyl phosphate (0.0375 g, 0.15 mmol), 2-mercapto-1-ethanol (0.0234 g, 0.3 mmol) are added into a 20 ml ampoule and mechanically stirred at 80° C. for 30 minutes. The reaction is quenched by triethylamine after the reaction. The reaction solution is added to the cold methanol solution until the polymer precipitates. The polymer is isolated by filtration to white solid and transferred to a vacuum oven to desiccation. The polymer is 1.4267 g and the yield of the product is 95%. The structure of the polymer is characterized by $^1$H NMR and $^{13}$C NMR. The molecular weight and the polymer dispersity index are determined by GPC, and the molecular weight is 5442, as well as the polymer dispersity index is 1.084. NMR verifies that the selectivity reaches 94%.

Embodiment 10

δ-Valerolactone (2.0024 g, 20 mmol), 3.0 ml of chloroform, diphenyl phosphate (0.0150 g, 0.06 mmol), 3-mercapto-1-propanol (0.0184 g, 0.2 mmol) are added into a 20 ml ampoule and mechanically stirred at 50° C. for 4 hours. The reaction is quenched by triethylamine after the reaction. The reaction solution is added to the cold methanol solution until the polymer precipitates. The polymer is isolated by filtration to white solid and transferred to a vacuum oven to desiccation. The polymer is 1.8622 g and the yield of the product is 93%. The structure of the polymer is characterized by $^1$H NMR and $^{13}$C NMR. The molecular weight and the polymer dispersity index are determined by GPC, and the molecular weight is 9436, as well as the polymer dispersity index is 1.135. NMR verifies that the selectivity reaches 95%.

Embodiment 11

ε-Caprolactone (1.8262 g, 16 mmol), 5 ml of toluene, diphenyl phosphate (0.0250 g, 0.1 mmol), 4-mercapto-1-butanol (0.0212 g, 0.2 mmol) are added into a 20 ml ampoule and mechanically stirred at 25° C. for 10 hours. The reaction is quenched by triethylamine after the reaction. The reaction solution is added to the cold methanol solution until the polymer precipitates. The polymer is isolated by filtration to white solid and transferred to a vacuum oven to desiccation. The polymer is 1.7531 g and the yield of the product is 96%. The structure of the polymer is characterized by $^1$H NMR and $^{13}$C NMR. The molecular weight and the polymer dispersity index are determined by GPC, and the molecular weight is 8775, as well as the polymer dispersity index is 1.088. NMR verifies that the selectivity reaches 97%.

Embodiment 12

δ-Valerolactone (1.6019 g, 16 mmol), 6.4 ml of toluene, diphenyl phosphate (0.0100 g, 0.04 mmol), 6-mercapto-1-hexanol (0.0268 g, 0.2 mmol) are added into a 20 ml ampoule and mechanically stirred at 50° C. for 3 hours. The reaction is quenched by triethylamine after the reaction. The reaction solution is added to the cold methanol solution until the polymer precipitates. The polymer is isolated by filtration to white solid and transferred to a vacuum oven to desiccation. The polymer is 1.5057 g and the yield of the product is 94%. The structure of the polymer is characterized by $^1$H NMR and $^{13}$C NMR. The molecular weight and the polymer dispersity index are determined by GPC, and the molecular weight is 7665, as well as the polymer dispersity index is 1.145. NMR verifies that the selectivity reaches 96%.

Embodiment 13

δ-Valerolactone (1.5018 g, 15 mmol), 6.1 ml of toluene, diphenyl phosphate (0.0375 g, 0.15 mmol), 6-mercapto-1-hexanol (0.0403 g, 0.3 mmol) are added into a 20 ml ampoule and mechanically stirred at 50° C. for 20 minutes. Then 2 ml of the reaction solution is extracted into a breaker using a syringe, and the ε-caprolactone (1.2555 g, 11 mmol) is injected into the ampoule using a syringe and mechanically stirred at 50° C. for 2.5 hours. The reaction is quenched by triethylamine after the reaction. Then the polymer is isolated by filtration to white solid and transferred to a vacuum oven to desiccation. The polymer is 0.3765 g and the yield of δ-valerolactone is 94%. The reaction is quenched by triethylamine after the end of the 2.5 hours reaction. The reaction solution is added to the cold methanol solution until the polymer precipitates. The polymer is isolated by filtration to white solid and transferred to a vacuum oven to desiccation. The polymer is 2.2279 g and the yield of ε-caprolactone is 95%. The structure of the polymer is characterized by $^1$H NMR and $^{13}$C NMR. The molecular weight and the polymer dispersity index are determined by GPC, and the molecular weight is 9846, as well as the polymer dispersity index is 1.036. NMR verifies that the selectivity reaches 96%.

Embodiment 14

ε-Caprolactone (1.7121 g, 15 mmol), 5.8 ml of toluene, diphenyl phosphate (0.0375 g, 0.15 mmol), 6-mercapto-1-hexanol (0.0403 g, 0.3 mmol) are added into a 20 ml ampoule mechanically and stirred at 50° C. for 2.5 hours. Then 2 ml of the reaction solution is extracted into a breaker using a syringe, and the δ-valerolactone (1.1374 g, 11 mmol) is injected into the ampoule using a syringe and mechanically stirred at 50° C. for 20 minutes. The reaction is quenched by triethylamine after the reaction. Then the polymer is isolated by filtration to white solid and transferred to a vacuum oven to desiccation. The polymer is 0.4337 g and the yield of the ε-caprolactone is 95%. The reaction is quenched by triethylamine after the end of the 20 minutes reaction. The reaction solution is added to the cold methanol solution until the polymer precipitates. The polymer is isolated by filtration to white solid and transferred to a vacuum oven to desiccation. The polymer is 2.2619 g and the yield of the δ-valerolactone is 94%. The structure of the polymer is characterized by $^1$H NMR and $^{13}$C NMR. The molecular weight and the polymer dispersity index are determined by GPC, and the molecular weight is 9785, as well as the polymer dispersity index is 1.050. NMR verifies that the selectivity reaches 97%.

Embodiment 15

δ-Valerolactone (1.5018 g, 15 mmol), ε-caprolactone (1.7121 g, 15 mmol), 4.4 ml of toluene, diphenyl phosphate (0.0375 g, 0.15 mmol), 6-mercapto-1-hexanol (0.0403 g, 0.3 mmol) are added into a 20 ml ampoule and mechanically stirred at 50° C. for 3 hours. The reaction is quenched by triethylamine after the reaction. The reaction solution is added to the cold methanol solution until the polymer precipitates. The polymer is isolated by filtration to white solid and transferred to a vacuum oven to desiccation. The polymer is 3.0532 g and the yield of the product is 95%. The structure of the polymer is characterized by $^1$H NMR and $^{13}$C NMR. The molecular weight and the polymer dispersity index are determined by GPC, and the molecular weight is 10305, as well as the polymer dispersity index is 1.084. NMR verifies that the selectivity reaches 96%.

What is claimed is:

1. A method for the one-step synthesis of thiol-functionalized polyester polyols by organocatalysis, characterized in that, lactone monomer as reaction raw material, thiol-alcohol as initiator, and diphenyl phosphate as organic catalyst to prepare thiol-functionalized polyester polyols by catalytic reaction.

2. The method according to claim 1, characterized in that, the thiol-functionalized polyester polyols have the following structure:

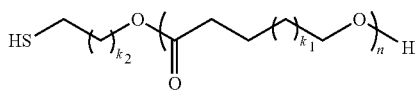

Wherein:
$k_1$=1, 2;
$k_2$=1, 2, 3, 5, 7, 8;
n=10~200;
the lactone monomers are δ-valerolactone and/or ε-caprolactone;
the structural formula of thiol-alcohol is as follows:

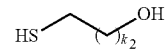

wherein, $k_2$=1, 2, 3, 5, 7, 8.

3. The method according to claim 2, characterized in that, the reaction molar ratio of the lactone monomer, the thiol-alcohol and the diphenyl phosphate is (10~100): 1: (0.1~0.5).

4. The method according to claim 2, characterized in that, the catalytic reaction is carried out in an organic solvent, such as toluene, benzene, chloroform and methylene chloride.

5. The method according to claim 2, characterized in that, the concentration of lactone monomer is 0.5~5 mol/L.

6. The method according to claim 2, characterized in that, the reaction temperature is between 20 and 100° C.

7. The method according to claim 2, characterized in that, the reaction time is 10~600 min.

8. The method according to claim 2, characterized in that, the reaction solution is quenched by adding triethylamine after the reaction process, and the reaction solution is added to methanol at −30 to 0° C. to precipitate into polymer separation, and then the polymer is separated by filtration to white solid and desiccated.

* * * * *